(12) United States Patent
Gillard et al.

(10) Patent No.: US 9,319,656 B2
(45) Date of Patent: Apr. 19, 2016

(54) APPARATUS AND METHOD FOR PROCESSING 3D VIDEO DATA

(71) Applicant: Sony Corporation, Tokyo (JP)

(72) Inventors: Clive Henry Gillard, Alton (GB); Stephen Mark Keating, Reading (GB); Mark Russell, Maidenhead (GB); Jonathan Richard Thorpe, Winchester (GB)

(73) Assignee: Sony Corporation, Tokyo (JP)

( * ) Notice: Subject to any disclaimer, the term of this patent is extended or adjusted under 35 U.S.C. 154(b) by 425 days.

(21) Appl. No.: 13/760,714

(22) Filed: Feb. 6, 2013

(65) Prior Publication Data

US 2013/0258051 A1 Oct. 3, 2013

(30) Foreign Application Priority Data

Mar. 30, 2012 (GB) .................................. 1205758.4

(51) Int. Cl.
*H04N 13/00* (2006.01)
(52) U.S. Cl.
CPC ....... *H04N 13/0022* (2013.01); *H04N 13/0059* (2013.01)
(58) Field of Classification Search
CPC .......... H04N 13/0059; H04N 13/0062; H04N 13/0066; H04N 13/007; H04N 13/0048
See application file for complete search history.

(56) References Cited

U.S. PATENT DOCUMENTS

| 4,910,585 A | 3/1990 | Smith et al. | |
|---|---|---|---|
| 2006/0133493 A1* | 6/2006 | Cho et al. | 375/240.16 |
| 2010/0157025 A1 | 6/2010 | Suh et al. | |
| 2010/0165077 A1* | 7/2010 | Yin et al. | 348/42 |
| 2010/0208942 A1 | 8/2010 | Porter et al. | |
| 2010/0309287 A1 | 12/2010 | Rodriguez | |
| 2011/0129143 A1 | 6/2011 | Keating et al. | |
| 2011/0164117 A1 | 7/2011 | Porter et al. | |
| 2011/0187827 A1 | 8/2011 | Porter et al. | |
| 2011/0199372 A1 | 8/2011 | Porter et al. | |
| 2011/0210965 A1 | 9/2011 | Thorpe | |
| 2011/0211042 A1 | 9/2011 | Thorpe et al. | |
| 2011/0211750 A1 | 9/2011 | Thorpe et al. | |
| 2011/0211751 A1 | 9/2011 | Thorpe et al. | |

(Continued)

FOREIGN PATENT DOCUMENTS

| GB | 2 003 001 A | 2/1979 |
|---|---|---|
| JP | 11-132721 | 5/1999 |
| WO | WO 2006/137006 A2 | 12/2006 |

OTHER PUBLICATIONS

Wa James Tam, et al., "3D-TV Content Genreation: 2D-To-3D Conversion", IEEE Int. Conf. on Multimedia and Expo, Jul. 9-12, 2006, 4 pages.

(Continued)

*Primary Examiner* — Victor Kostak
(74) *Attorney, Agent, or Firm* — Oblon, McClelland, Maier & Neustadt, L.L.P

(57) ABSTRACT

A method comprising: obtaining a disparity map for one of a left eye image and a right eye image, the disparity map indicating the horizontal displacement between corresponding pixels in the left eye image and the right eye image; generating a luminance representation of the disparity map, wherein a disparity unit which defines the resolution of the disparity map, is mapped to a corresponding luminance value; and companding the luminance value for transmission over a luminance channel is described.

14 Claims, 6 Drawing Sheets

(56) References Cited

U.S. PATENT DOCUMENTS

| | | |
|---|---|---|
| 2011/0254919 A1* | 10/2011 | Ushiki et al. .................. 348/43 |
| 2011/0267433 A1 | 11/2011 | Thorpe et al. |
| 2011/0285817 A1 | 11/2011 | Tsukagoshi |
| 2012/0050485 A1 | 3/2012 | Thorpe et al. |
| 2012/0051624 A1 | 3/2012 | Ando |
| 2012/0084652 A1* | 4/2012 | Martinez Bauza et al. ... 715/719 |
| 2012/0098856 A1 | 4/2012 | Thorpe |
| 2014/0125660 A1* | 5/2014 | Redmann ..................... 345/419 |

OTHER PUBLICATIONS

United Kingdom Search Report issued Feb. 22, 2013 in Patent Application No. GB1205758.4.

* cited by examiner

APPARATUS AND METHOD FOR PROCESSING 3D VIDEO DATA

BACKGROUND

1. Field of the Disclosure

The present disclosure relates, in general, to an apparatus and method for transmitting disparity maps.

2. Description of the Related Art 3D television and film is becoming increasingly popular. Typically, when generating 3D content, a disparity map is formed which identifies the amount of horizontal separation between the left and right eye versions of each image. Specifically, a map is formed showing the amount of difference between the left and right eye versions of each pixel in each image. The disparity map may be used for many reasons. One example is to determine where to place graphics within the 3D image. This ensures that a graphic is not placed in an inappropriate location on the screen, and more specifically, so that the graphic does not occlude part of or all of the 3D image that is in front of the graphic in 3D space. The disparity map may also be used to determine where to locate subtitles, such as closed captioning.

It is known to place any captions or graphics in front of all other objects within the 3D image. In order to achieve this, the caption is placed within the 3D video using a vision mixer. Placing the captions or graphics in this location allows the graphic not to be occluding part or all of the 3D image and is particularly useful in real-time insertion of a caption as a maximum amount of disparity for each pixel in the image can be determined and never exceeded. However, positioning the graphic in such a way has the disadvantage of causing discomfort to the viewer over an extended period because the viewer must look at the caption and then to re-adjust their eyes to view the 3D image.

It would be desirable to find a way of determining the disparity map quickly so that the caption can be placed at an appropriate place within the 3D environment.

Moreover, as mechanisms currently exist to allow the inclusion of captions into a 3D image, it would be desirable to be backwardly compatible with current technology. In particular, it would be useful to enable where to place the caption using current vision mixers.

SUMMARY OF THE DISCLOSURE

According to an aspect of the disclosure, there is provided a method comprising: obtaining a disparity map for one of a left eye image and a right eye image, the disparity map indicating the horizontal displacement between corresponding pixels in the left eye image and the right eye image; generating a luminance representation of the disparity map, wherein a disparity unit which defines the resolution of the disparity map, is mapped to a corresponding luminance value; and companding the luminance value for transmission over a luminance channel.

This allows a disparity map to be transferred over the luminance channel of, for example, an HD-SDI connection. This allows the disparity map to be used by a conventional vision mixer.

The luminance may be companded using a logarithmic function. This is useful because a logarithmic function has a steep roll-off allowing a better resolution in commonly used disparities.

The luminance may companded using a segmented linear function.

The companding function may selected in dependence on the size of the display onto which the left eye image and the right eye image are to be stereoscopically displayed so that the gradient of the companding function is greatest at a disparity suited to the display.

This allows a better resolution in commonly used disparities for the display

In the case of a logarithmic function being used, the logarithmic function may be $$F(x) = 512 + \text{round}\left(512 \; \text{sign}(x) \frac{\ln\left(1 + \mu\left|\frac{x}{Dispscale}\right|\right)}{\ln(1 + \mu)}\right)$$

Between the limits—Dispscale≤x≤+Dispscale where Dispscale is the number of disparity units; μ is a variable that controls the magnitude of the logarithmic function; sign(x) means±(x) and the round rounds the function to the nearest integer value.

In the case of a linear segmented function being used, wherein the linear function may be segmented into a first and second segment, wherein the companding function of the first segment is $$F(x) = 512 + \text{round}\left(\frac{x}{8}\right) \qquad -2048 < x < 2048$$

And the companding function for the second segment is $$F(x) = 512 + \text{round}\left(\frac{x}{256} + 248 \; \text{sign}(x)\right) \quad \begin{array}{l} -DispScale \le x \le -2048 \\ 2048 \le x \le DispScale \end{array}$$

Where Dispscale is the number of disparity units; sign(x) means±(x) and the function round rounds the function to the nearest integer value.

The method may further comprise generating an error signal, the error signal being the difference between the companded luminance value and the luminance value; and converting the error signal for transmission over a chrominance channel.

In this case, the method may further comprise expanding the companded luminance value; retrieving the error signal from the chrominance channel and adding the retrieved error signal to the expanded luminance value to form the original luminance value.

The method may further comprise retrieving the companded luminance value from a look-up table where the companded luminance value is stored in association with the luminance value.

In this case, the method may further comprise retrieving the error signal from a look up table where the error signal is stored in association with the luminance value.

According to an aspect of the disclosure, a vision mixer comprising: a luminance channel and a chrominance channel configured in use to receive a companded luminance signal over the luminance channel and an error signal over the chrominance channel; and a video mixing device configured in use to receive a caption to be inserted into a video, and to provide the location and depth at which the caption is to be inserted into the video, wherein the location is determined in accordance with the received companded luminance signal.

The vision mixer may further comprise: an expander configured in use to convert the received companded luminance signal into a second luminance signal; and an adder configured in use to add the second luminance signal to the received error signal.

According to another aspect, there is provided an encoder comprising: a disparity map obtaining device configured in use to obtain a disparity map for one of a left eye image and a right eye image, the disparity map indicating the horizontal displacement between corresponding pixels in the left eye image and the right eye image; a luminance value generator configured in use to generate a luminance representation of the disparity map wherein a disparity unit, which defines the resolution of the disparity map, is mapped to a corresponding luminance value; and a companding device configured in user to compand the luminance value for transmission over a luminance channel.

The luminance may be companded using a logarithmic function.

The luminance may be companded using a segmented linear function.

The companding function may be selected in dependence on the size of the display onto which the left eye image and the right eye image are to be stereoscopically displayed so that the gradient of the companding function is greatest at a disparity suited to the display.

In the case of a logarithmic function being used, the logarithmic function may be $$F(x) = 512 + \text{round}\left(512 \; \text{sign}(x) \frac{\ln\left(1 + \mu \left|\frac{x}{Dispscale}\right|\right)}{\ln(1 + \mu)}\right)$$

Between the limits—Dispscale≤x≤+Dispscale
where Dispscale is the number of disparity units; μ is a variable that controls the magnitude of the logarithmic function; sign(x) means±(x) and the round rounds the function to the nearest integer value.

In the case of a segmented linear function being used, the linear function may be segmented into a first and second segment, wherein the companding function of the first segment is $$F(x) = 512 + \text{round}\left(\frac{x}{8}\right) \qquad -2048 < x < 2048$$

And the companding function for the second segment is $$F(x) = 512 + \text{round}\left(\frac{x}{256} + 248 \; \text{sign}(x)\right) \quad \begin{array}{c} -DispScale \le x \le -2048 \\ 2048 \le x \le DispScale \end{array}$$

Where Dispscale is the number of disparity units; sign(x) means±(x) and the function round rounds the function to the nearest integer value.

The encoder may further comprise an error signal generator configured in use to generate an error signal, the error signal being the difference between the companded luminance value and the luminance value; and an error signal converting device configured in use to convert the error signal for transmission over a chrominance channel.

The encoder may further comprise a look up table, wherein the look up table is configured in use to store the companded luminance value in association with the luminance value, and the companding device is configured in use to retrieve the companded luminance value from the look-up table.

In this case, the look-up table may be configured in use to store the error signal, where the error signal is stored in association with the luminance value and the companding device is further configured to retrieve the error signal from the look-up table.

According to another aspect, there is provided a decoder comprising: a luminance channel input and a chrominance channel input configured in use to receive a companded luminance signal via the luminance channel input and an error signal via the chrominance channel input; and an expander configured in use to convert the received companded luminance signal into a second luminance signal.

The decoder may further comprise an adder configured in use to add the second luminance signal to the received error signal.

According to another aspect, there is provided computer software containing computer readable instructions which, when loaded onto a computer, configure the computer to perform a method according to any one of the embodiments.

According to another aspect, there is provided a computer program product configured to store the computer software according to embodiments therein or thereon.

BRIEF DESCRIPTION OF DRAWINGS

The above and other objects, features and advantages of the disclosure will be apparent from the following detailed description of illustrative embodiments which is to be read in connection with the accompanying drawings, in which.

DESCRIPTION OF THE EMBODIMENTS

Figure 1:
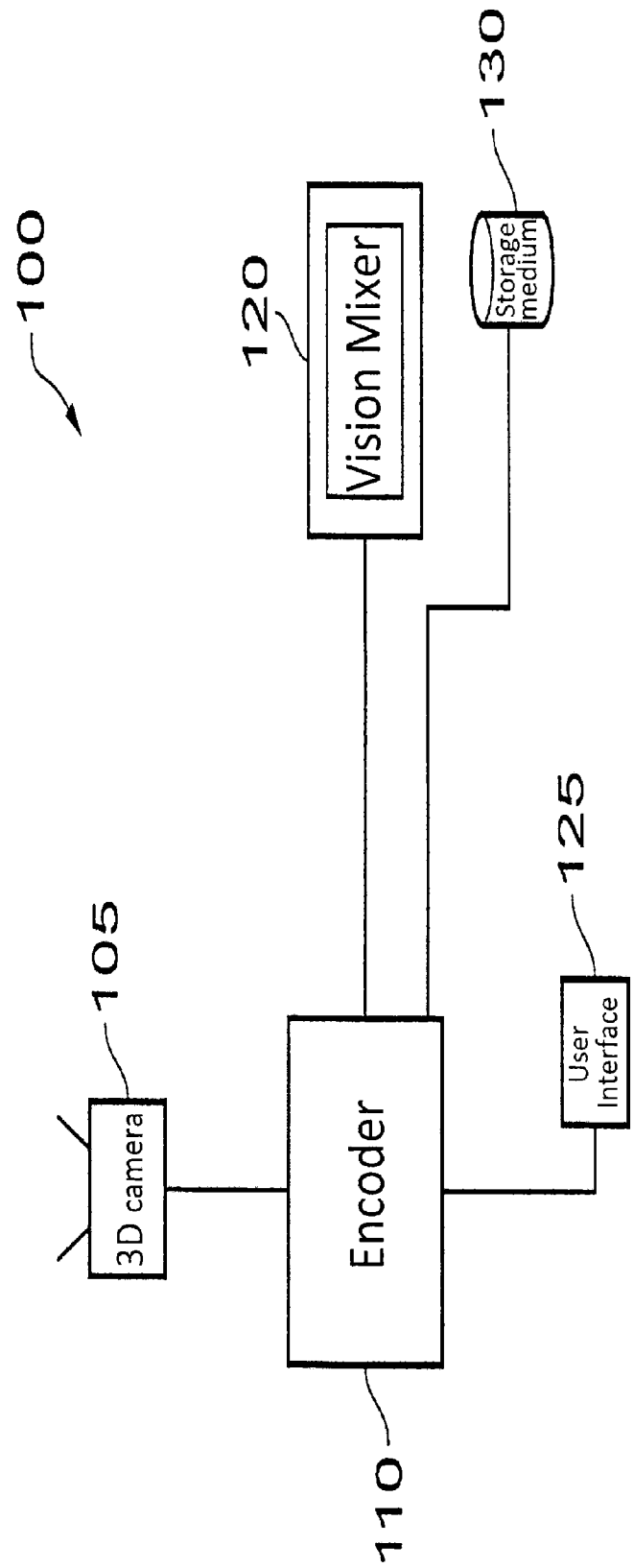
FIG. 1 shows a system according to embodiments of the present disclosure.

Referring to FIG. 1, a system 100 for capturing a 3D image and for determining a disparity map is shown. A 3D camera 105 captures an image. As would be appreciated, the 3D camera 105 captures an image for the left eye of a viewer and an image for the right eye of the viewer. The left and right eye images are horizontally displaced from one another. The left eye image and the right eye image are sent to an encoder 110. The 3D camera 105 and the encoder 110 may be connected using a wired or wireless connection.

Additionally connected to the encoder 110 is a user interface 125. The user interface 125 may be a keyboard or a mouse or indeed may be tablet type device such as the Sony® tablet S or a smartphone such as the Sony® Xperia S. The user interface 125 may be connected to the encoder 110 using a wireless or wired connection. A storage medium 130 is also connected to the encoder 110. The storage medium 130 may be an optical or magnetically readable medium or may be a solid state storage medium. The storage medium 130 is used to store the captured left eye and right eye images. These images can then be accessed by an editing suite where captions may be inserted. For brevity, an explanation of the editing suite is not included as it does not clarify embodiments of the disclosure.

Also connected to the encoder 110 is a vision mixer 120. The vision mixer 120 is connected to the encoder 110 using a connection. Although many types of connection are envisaged, such as an SDTI (Serial Data Transport Interface) connection in embodiments an HD-SDI (High Definition—Serial Digital Interface) connection is used. As will be explained later, the disparity map information produced by the encoder 110 is digital information that indicates the horizontal distance between pixels in the right eye image and the left eye image. Typically, a disparity map is generated for each of the left and right eye image. So, the disparity map for the right eye image indicates the horizontal displacement of the same pixel in the left eye image.

As the disparity map is not video data, it may be transferred over the SDTI connection in its original form. In embodiments there is a transfer of the disparity map to the vision mixer 120 as luminance data over the HD-SDI connection. By transferring the disparity map data to the vision mixer 120 over the luminance data channel of the HD-SDI connection allows the caption to be positioned with the appropriate disparity so that it may be placed at the appropriate distance from the display when viewed by a user. This not only allows the caption to be located at the appropriate depth to avoid occluding the objects in the 3D content, but providing the luminance data in HD-SDI also assists with backwards compatibility with current vision mixers.

As will be appreciated by the skilled person, although the following explains using the disparity map with the vision mixer 120, the disclosure is not so limited. As will be appreciated, the disparity map may be fed to a display instead of or in addition to the vision mixer 120 in FIG. 1. The disparity map may be used in a display to provide improved visual representation of the disparity map. In other words, the disparity map may be provided by an external source and may be pre-calculated.

As the HD-SDI connection transfers video information, and in particular, chrominance and luminance information only, the disparity map information must be processed by the encoder 110 before being sent over the connection to the vision mixer 120. In particular, the disparity map data must be converted into luminance data so that for a given value of disparity, there is a given value of luminance.

After conversion into a luminance value, the disparity map information may be used by a conventional vision mixer without modification of the vision mixer. This is because HD-SDI is a typical format used in broadcast to view images. Alternatively, as will be explained, in the case of using the disparity map information on a conventional vision mixer, the disparity map information will likely include errors. However, in embodiments of the present disclosure, a vision mixer 120 is provided in which the errors are corrected.

In order to illustrate a disparity map, a displayed disparity map is shown. In a left eye image 205, a circle and square are to be shown in 3D. The right eye image 210 is shown below the left eye image. As can be seen, the horizontal distance between the square in the left eye image and the right eye image is greater than the horizontal distance between the circle in the left eye image and the right eye image. Accordingly, if the left eye image and the right eye image were displayed stereoscopically, the circle would appear closer to the viewer 230 than the square. In other words, the distance d which indicates the perceived distance of the square from the image plane would be less than d' which indicates the perceived distance of the circle from the image plane.

If, for each value of disparity, a corresponding value of luminance was generated, a disparity map 235 for the left eye image is created. The visualisation of this disparity map is shown in 235. Similarly the visualisation disparity map 240 for the right eye image is shown. As is evident from the figures, the disparity map of the square is black whereas the circle is grey (indicated by the hashed lines). In other words, if the disparity map is displayed using the luminance channel, the greater the disparity at a pixel position in the left or right eye image, the lighter the pixel in the displayed disparity map. So, this means that for each value of disparity in the disparity map, there is a corresponding value of luminance. This illustrates that for any given value of disparity, a luminance value exists. Therefore, the vision mixer 120 may use luminance as a key to determine where to locate the graphic.

Uses of Disparity Map Over Luminance Channel

Figure 2:
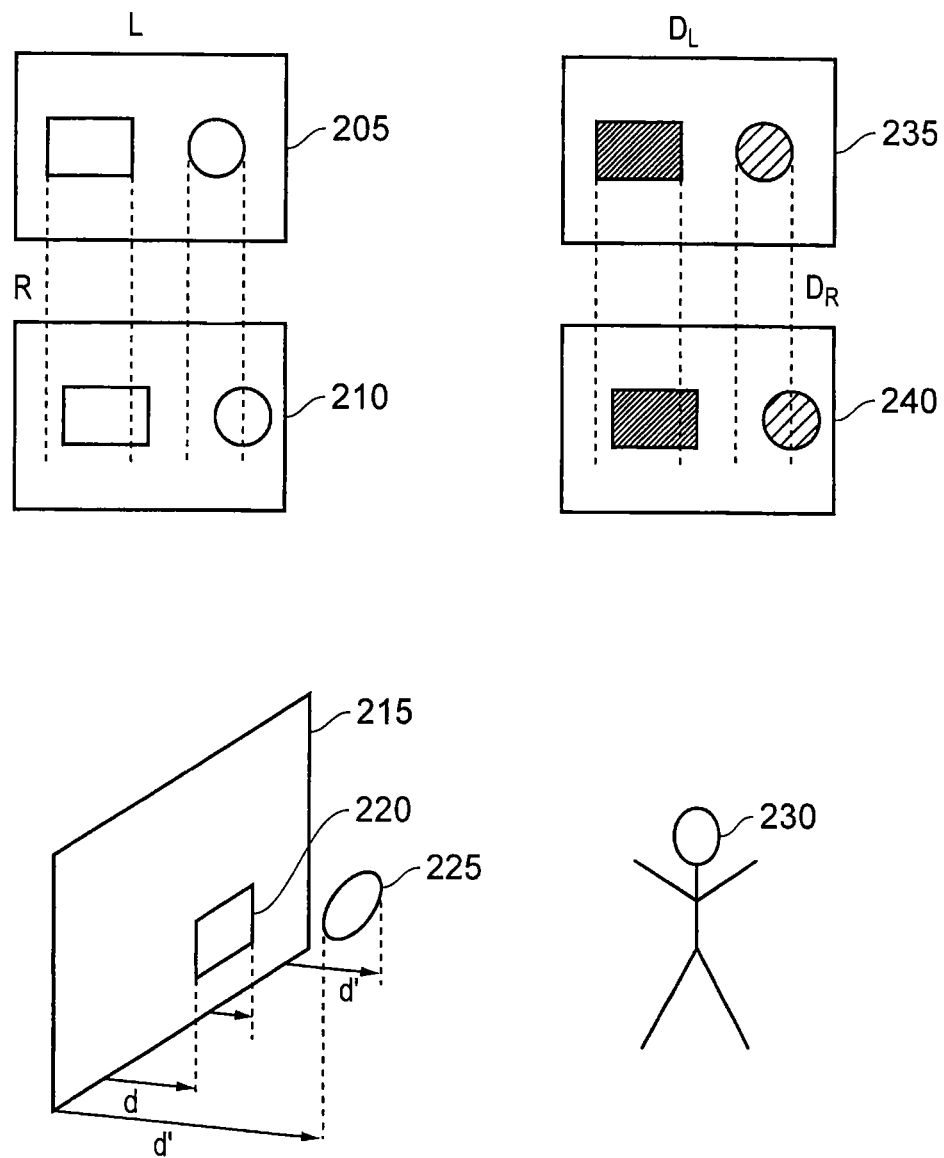
FIG. 2 shows a diagram explaining the use of displaying a disparity map on a system according to embodiments of the present disclosure.

As noted in FIG. 2, as one particular value of luminance is mapped to one value of disparity, it is possible to the use the luminance value as a key for graphics insertion.

Keying is used in vision mixers to determine where to insert a caption or graphic. It is known to use chroma keying when deciding where to locate a graphic. For example, so-called "Green Screen" is known where an actor or presenter stands in front of a green screen. The vision mixer knows that it must insert the graphic wherever the chroma signal includes that particular shade of green.

In embodiments of the present disclosure, luminance keying is used to determine where the caption should be located in the video and the amount of disparity to provide to a caption. In the case that a caption having a disparity map (converted into luminance data) and video content having a second disparity map (converted into luminance data) are fed into the vision mixer, by keying a particular luminance value, the vision mixer knows where the graphic or caption should be located in the video so to ensure that the caption or graphic does not occlude the object in the 3D image. As will be explained, this is achieved by the vision mixer keying to a particular luminance value, and if the caption would occlude the content, a minimum luminance value being taken. The vision mixer 120 then provides information so that the caption can be inserted to the content at a disparity provided by this minimum luminance value.

Figure 3A:
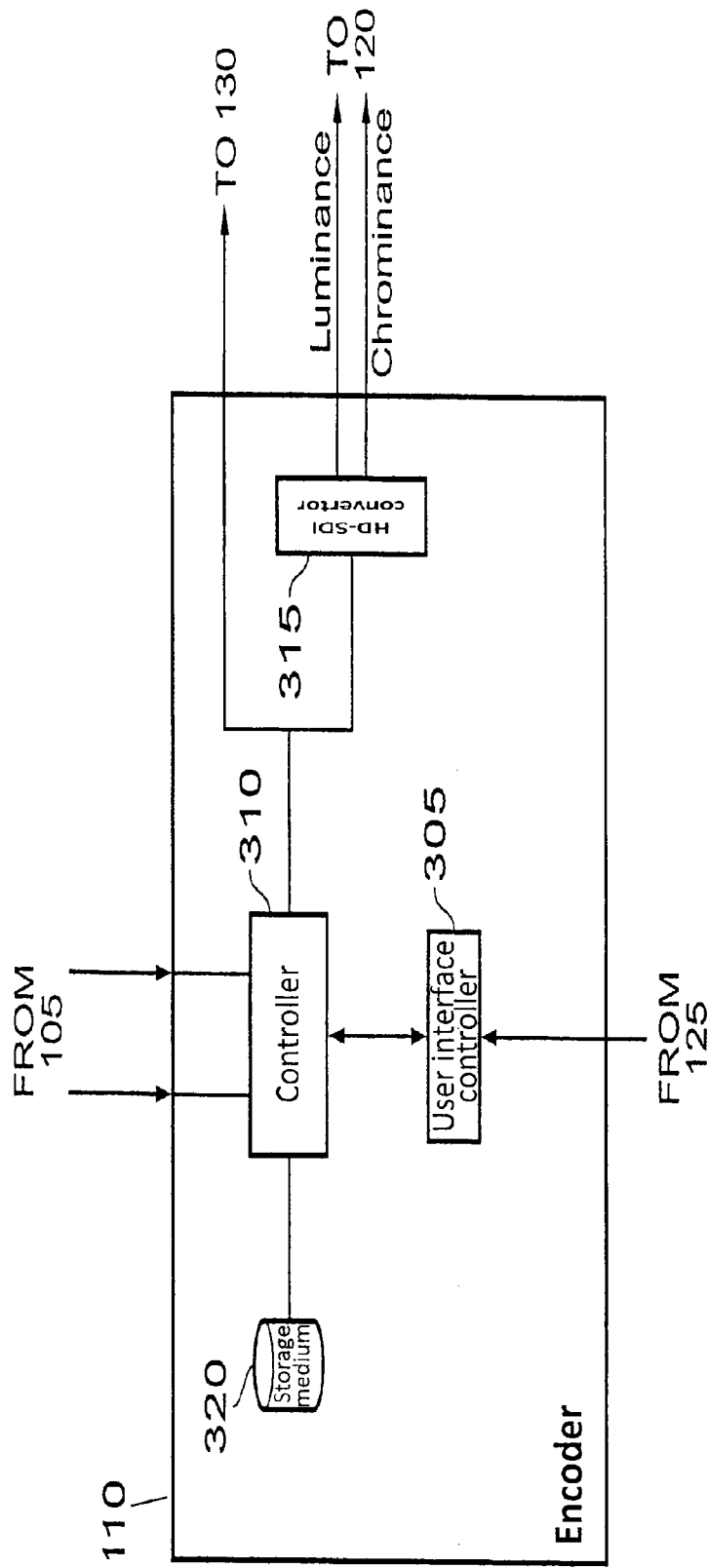
FIG. 3A shows an encoder according to an embodiment of the present disclosure.

Referring to FIG. 3A, the left and right image from the camera 105 is fed into a controller 310. The controller 310 is, in embodiments, a microprocessor. The controller 310 operates using a computer program. The computer program is stored on controller storage medium 320. The controller storage medium 320 may be a magnetically readable, optically readable or solid state storage medium. Indeed the computer program may be embodied as a signal which may be transferred over the Internet or the like. The controller storage medium 320 is connected to the controller 310.

Additionally connected to the controller 310 are a user interface controller 305 and a HD-SDI convertor 315. The HD-SDI convertor 315 will be described in more detail with reference to FIG. 3B. The user interface controller 305 is connected to the user interface 125. When the user controls the user interface 125, the user interface controller 305 generates controls signals which are input into the controller 310.

The controller 310 generates the disparity map for each of the left and right images captured by the 3D camera 105. The mechanism by which the disparity map is generated is known. For example, the disparity map may be generated using image based block matching techniques or depth sensor techniques such as laser or infra-red rangers or the like. However, as noted above, the disparity map may be provided externally and may not be created within the controller 310.

The generated disparity map for each the left eye and right eye image is fed to the HD-SDI convertor 315. The HD-SDI convertor 315 converts the disparity map into a luminance signal and optionally an error signal. The luminance signal is fed to the vision mixer over the luminance channel and the error signal is fed to the vision mixer 120 over the chrominance channel. The purpose of the error signal will become apparent hereinafter.

An unconverted disparity map is also fed to the storage medium 130 for storage thereon.

Conversion of the Disparity Map into a Luminance and optional Error Signal

In order to convert the disparity map into a luminance signal and an optional error signal, the resolution of the disparity map is determined. The resolution of the disparity map means the minimum amount of distance between a pixel in one image and the corresponding pixel in the other image that can be observed.

In some situations, it is desirable to provide a maximum disparity of ±1 screen width. This may be desirable in situations where there is a very small screen size used to view the 3D image and so the distance between pixels is very small. An example of this would be a 3D enabled smartphone that has a screen made of lenticular lenses.

However, in most situations the amount of disparity required between the left eye image and the right eye image is much smaller as a percentage of screen width. For example for video captured for display on a television, the disparity is typically +3% to −2% of screen width and for video captured for display in a movie theatre, the disparity is typically +1% to −2% of screen width. However, it is understood that other levels of disparity may be typical. The other levels of disparity may depend, for example, on screen size and/or the video effect required.

In some situations, it is desirable to provide a minimum disparity of ±1/32 of a pixel. This sub-pixel disparity allows for most 3D video effects, and is especially suited for 3D images to be displayed in a movie theatre. Again, the skilled person would appreciate though that any level of minimum disparity may be selected.

Therefore, in the above case where a minimum disparity of ±1/32 of a pixel is supported, the minimum resolution (termed "disparity units" hereinafter) is 1/32 pixel.

In a full High Definition display (which we mean to be a 1080i/p display having a horizontal width of 1920 pixels), the number of disparity units which must be supported by the conversion is 32*1920=±61440 disparity units. In other words, and more generally, for a maximum disparity of ±1 frame width, the number of disparity units that would, in embodiments, be supported by the HD-SDI convertor 315 is given by equation (1)

Number of disparity units=±number of pixels in horizontal direction of screen*number of sub-pixels to make one pixel [Equation (1)]

In order to provide the dynamic range of ±61440 disparity units when fed to the vision mixer 120 on the luminance channel, the luminance value of each pixel in the disparity map must be represented by a 17 bit number. Clearly, the number of bits that are required to represent the number of the disparity units is dependent upon the both the minimum resolution of the disparity unit and the size of the screen upon which the video will be displayed. For a given number of sub-pixels (i.e. 32 disparity units per pixel in the above case), for a larger screen size, a larger dynamic range is required. This may necessitate a larger number of bits to represent the disparity units. However, it may be desirable to maintain the size of dynamic range and alter the minimum resolution for any size of screen upon which the video is to be provided. So, for example, maintaining the dynamic range of ±61440 disparity units, if the screen size is 2048 pixels wide, the minimum resolution of the disparity map is $1/30^{th}$ of a pixel.

As already noted, it is desirable to view the disparity map (with a dynamic range represented by 17 bits) as a luminance signal over an HD-SDI connection. However, as is understood by the skilled person, the luminance channel of the HD-SDI connection supports less than 17 bits dynamic range. Typically, the luminance channel of the HD-SDI supports a 10 or 12 bit number. Similarly, the chrominance channel of the HD-SDI connection supports less than 17 bits dynamic range, and typically this is a 10 bit or 12 bit number. For convenience, the following explanation relates to the 10 bit luminance and chrominance channel.

In embodiments, the 17 bit number which represents the pixel value of a pixel in the disparity map is converted into a 10 bit number.

Conversion of the 17 Bit Disparity Unit Number Into 10 Bit HD-SDI Luminance Value In order to convert the 17 bit disparity unit number into a 10 bit HD-SDI luminance value, in embodiments, the video image is companded. Companding is a term of art and allows signals with a large dynamic range to be transmitted over a channel having a smaller dynamic range capability. The process of companding, however, is a lossy process.

In order to utilise the 10 bit luminance channel, a logarithmic encoding function is used. This is because typically the amount of disparity between the left and right image depends to an extent on the size of the screen upon which the 3D content will be viewed. For example, as noted above, when the content is to be viewed on a television ±3% to −2% of screen width is common for upper limits on disparity.

Therefore, by selecting a logarithmic encoding function, which has a logarithmic curve around the ±3% of screen width, the amount of error in the disparity around this area is low due to the roll-off of the logarithmic function. This means that the amount of error introduced by companding in this region used for content being displayed on television or in a movie theatre is low. However, as the level of disparity increases and approaches the ±1 frame width, the amount of error increases. But, as this level of disparity is used less frequently for 3D content being displayed in a movie theatre or television, this error is tolerable.

Clearly, the logarithmic encoding function can be selected depending on the size of screen upon which the 3D content will be displayed. For example, given a smartphone has a small screen, it is unlikely that a disparity of ±3% would be used and that the disparity would be larger as a percentage of screen width. Therefore in this case, the logarithmic function can be selected that would increase the accuracy of the companding in the region used by the screen size upon which the 3D is to be displayed.

So, in the example of companding a luminance value used to represent a disparity map for 3D content to be displayed on a TV or in a movie theatre, it is further possible to use the companding function $$F(x) = 512 + \text{round}\left(512 \text{ sign}(x)\frac{\ln\left(1+\mu\left|\frac{x}{Dispscale}\right|\right)}{\ln(1+\mu)}\right) \quad \text{[Equation (2)]}$$

Between the limits—Dispscale≤x≤+Dispscale

Where Dispscale is the number of disparity units; $\mu$ is a variable that controls the magnitude of the logarithmic function. In embodiments, the value of $\mu$ is either 255 or 1023, although any value of $\mu$ may be used within the limits of table 1 explained hereinafter. The term sign(x) means±(x) and the function round rounds the function to the nearest integer value.

Accordingly, the decoding function is $$F^{-1}(y) = \quad \text{[Equation (3)]}$$
$$\text{round}\left(Dispscale \text{ sign}(y-512)\left(\frac{1}{\mu}\right)\left((1+\mu)^{\left|\frac{y-512}{512}\right|}-1\right)\right)$$

Where the variables have already been defined above with respect to the encoding function.

As noted above, the companding of the 17 bit disparity data into a 10 bit luminance signal results in an error. This error is defined as $$\text{Error}=x-F^{-1}(F(x)) \quad \text{[Equation 4]}$$

In other words, the error is calculated by firstly decoding the companded disparity map data and then calculating the difference between the decoded (sometimes referred to as "expanded") data and the original data. As noted above, in embodiments, the error will be smaller for disparities that are more common for TV and movie theatre content than for larger, less often used values of disparity using the logarithmic function.

Although the companded 17 bit disparity value is reduced to 10 bits using equation (2) and sent over the luminance channel to the vision mixer 120, the disparity map will contain errors. This is due to companding being a lossy process. However, as companding is performed so that the compression applied to the luminance value representing commonly used disparity values, the error in the disparity map transferred over the 10 bit luminance channel is reduced.

In order to remove the error completely, the error signal must be fed to a vision mixer according to embodiments of the present disclosure. The following will describe when the error signal is fed to the vision mixer according to embodiments. The error value is fed to the vision mixer 120 of embodiments of the disclosure using the 10 bit chrominance channel. The error value will be used by the vision mixer 120 to recreate the correct value of luminance as will be explained with reference to FIG. 4 which shows a vision mixer according to an embodiment of the present disclosure.

In order to ensure that the original signal can be re-created, the error value must not exceed the 10 bits available on the chrominance channel. To ensure that the error value does not exceed the 10 bits available on the chrominance channel, the value of $\mu$ and DispScale in equation 2 must be carefully selected. In particular, the maximum value of $\mu$ is selected in dependence upon the value of DispScale. Table 1 shows the relationship between the maximum value of $\mu$ and the value of DispScale to ensure that the error value does not exceed 10 bits available on the chrominance channel.

TABLE 1

| DispScale (number of Disparity Bits) | Maximum $\mu$ |
|---|---|
| 30720 (16 Bits) | ∞ |
| 61440 (17 Bits) | 4997 |
| 122880 (18 Bits) | 64 |

Figure 3B:
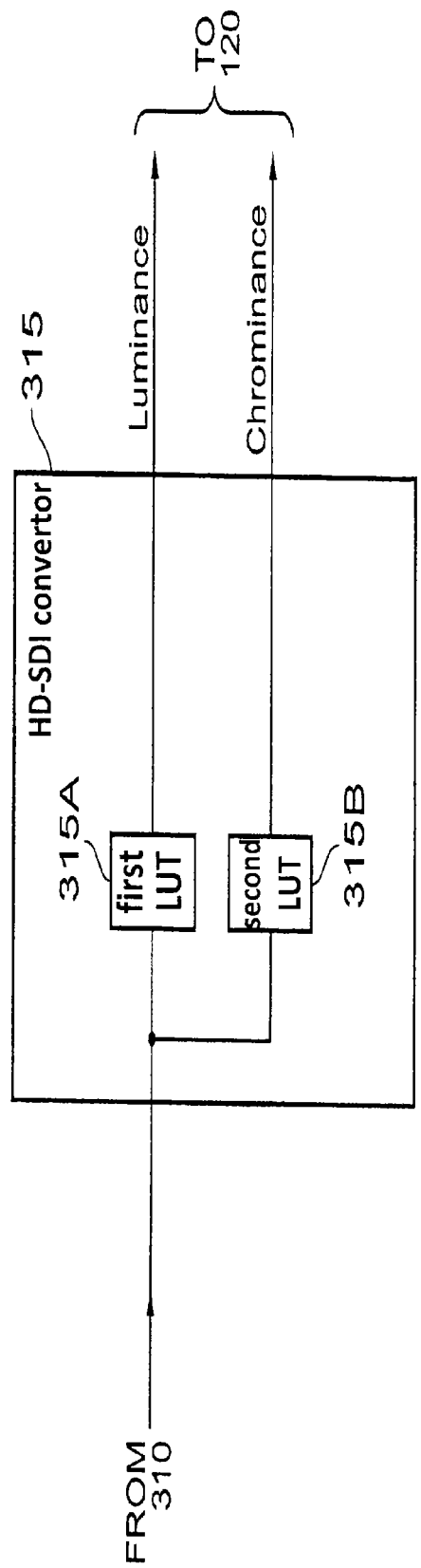
FIG. 3B shows a HD-SDI convertor according to embodiments of the present disclosure.

Referring to FIG. 3B, an embodiment of the HD-SDI convertor 315 will be described. The HD-SDI convertor 315 contains a 17 bit first look-up table (LUT) 315A and a 17 bit second LUT 315B. The 17 bit disparity map is fed into both the first LUT 315A and the second LUT 315B. The first LUT 315A contains for each value of the disparity map (x) the corresponding value (F(x)) defined by equation 2. Therefore, for any value 17 bit value of disparity, the appropriate 10 bit luminance signal is output over the luminance channel. Similarly, the 17 bit luminance value is fed into the second LUT 315B. The second LUT 315B stores, for each value of the disparity map (x) the corresponding error value defined by equation 4. The use of look-up tables allows operation so that the value of F(x) and Error does not need to be calculated on the fly, and is quickly obtained.

Figure 4:
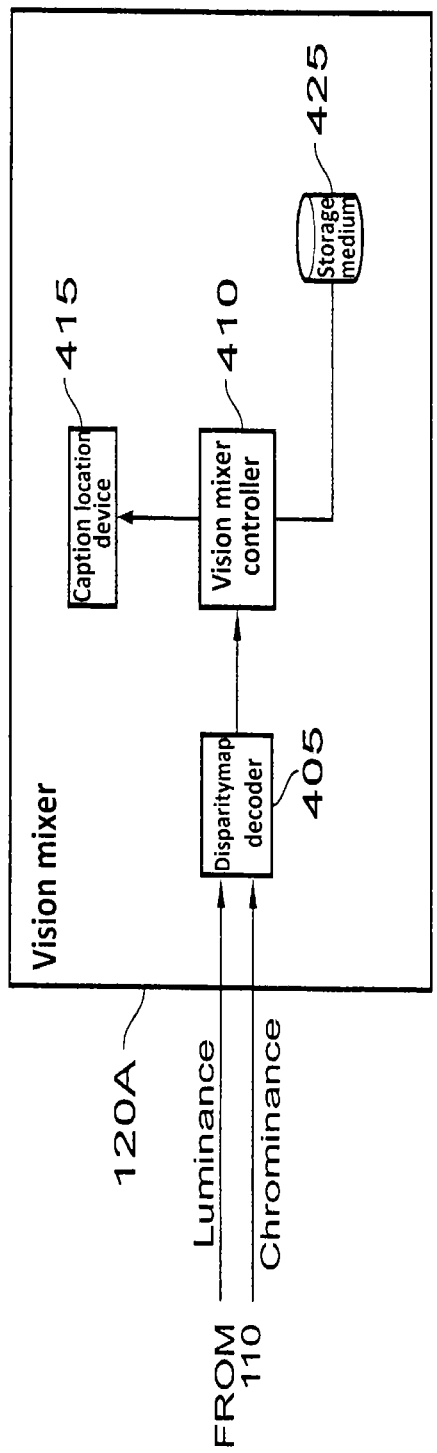
FIG. 4 shows a vision mixer according to embodiments of the present disclosure.

Referring to FIG. 4, the 10 bit luminance signal and the 10 bit error signal (fed in to the vision mixer 120 over the 10 bit chrominance channel) are fed into a disparity map decoder 405. The disparity map decoder 405 applies the decoding function of equation 3 to the 10 bit luminance signal to expand the companded luminance value. Similarly to the HD-SDI convertor 315, the disparity map decoder 405, in embodiments, comprises a 10 bit look-up table which has the values of $F^{-1}(y)$ stored in association with a value of the received 10 bit luminance value.

As noted hereinbefore, the value of $F^{-1}(y)$ will contain errors. In order to correct the error for each value output from the 10 bit look-up table, the error value fed to the vision mixer using the chrominance channel will be added by the decoder 405 to the value of $F^{-1}(y)$ output from the 10 bit look-up table. As the 10$^{th}$ bit of the $F^{-1}(y)$ is a sign bit, no further processing of the error value is required and a simple addition of the error value and $F^{-1}(y)$ need be performed.

In the vision mixer 120 of embodiments, the disparity map decoder 405 is connected to a vision mixer controller 410. Typically, the vision mixer 120 will have multiple video streams, captions and disparity maps input thereto. The vision mixer controller 410 is controlled using software stored on vision mixer storage medium 425. The vision mixer controller 410 receives the disparity map from each input source and provides control signals to a caption location device 415. The caption location device 415 is configured to determine the location in video content to insert the graphic or caption on the basis of the output of the disparity map decoder 405. The caption location device 415 also determines the depth at which the caption should be inserted. This is achieved by selecting a minimum disparity, from the luminance data, and providing instructions to a 3D caption creation system (not shown) to place the caption at the selected location and at the selected depth.

As will be appreciated by the skilled person, the disparity map decoder 405 may be integrated into a vision mixer device according to embodiments or may be a separate device connected to a vision mixer.

Figure 5:
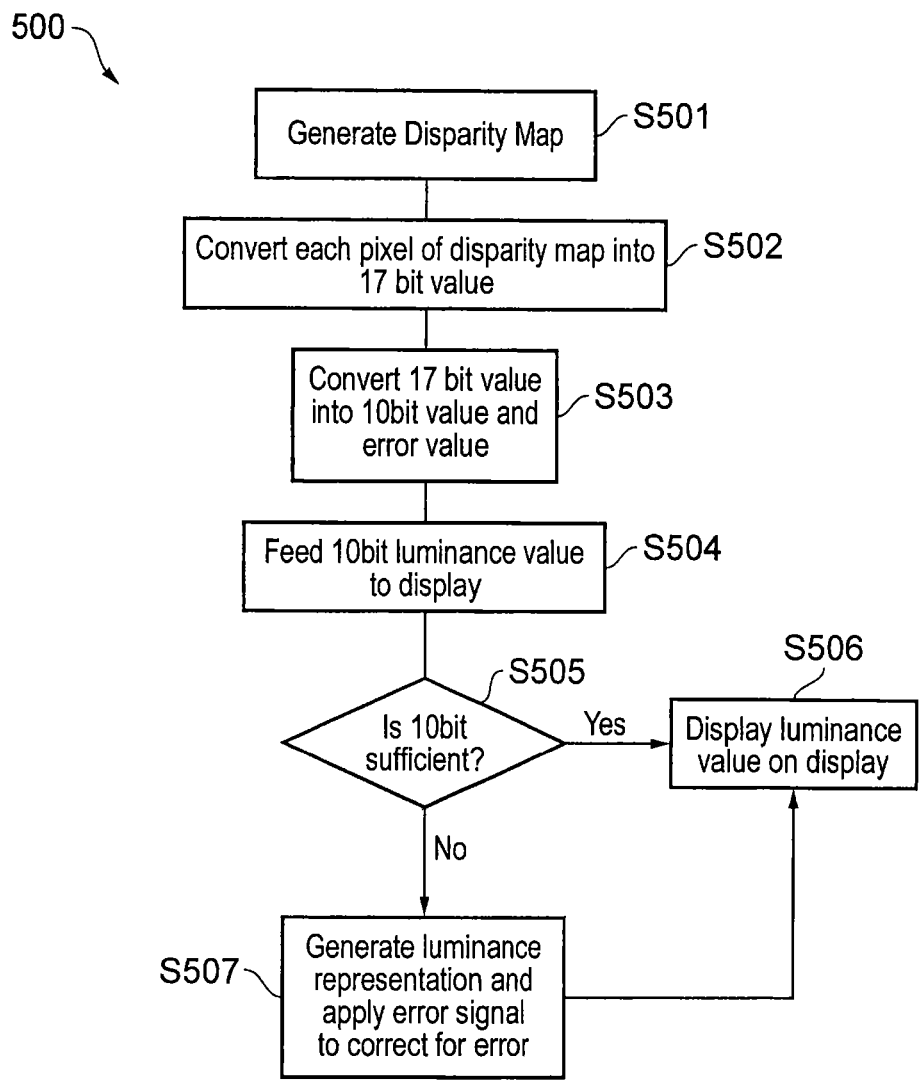
FIG. 5 shows a flow chart explaining embodiments of the present disclosure.

Referring to FIG. 5, a flow diagram explaining embodiments of the present disclosure is disclosed. Typically, the flow diagram will be followed by a computer program according to embodiments of the present disclosure. In step 501 the disparity map is generated by controller 310 (although the disparity map may be provided externally to the system). Each pixel of the disparity map in one or both of the left and right eye images is converted into a 17 bit luminance value. This is step S502. The 17 bit value is converted into a 10 bit luminance value and an error value in step S503.

The 10 bit luminance value is fed to a vision mixer in step S504. A decision is made at step s505. If 10 bit resolution at the vision mixer is sufficient the "yes" path is followed and the disparity map is used to locate the position of the graphic or caption in step S506. If the vision mixer requires 17 bit resolution of the disparity map, the luminance representation is generated and the error value is applied to the representation to correct for the error. This occurs in step S507. The corrected disparity map is then used in vision mixer in step S506 to determine the location of the caption or graphic in video content.

It should be noted that although the above describes the companding function as a logarithmic function, in embodiments the companding function may be a segmented linear function instead. In this case, instead of a logarithmic function being used to reduce the 17 bit luminance value into the 10 bit companded luminance value, the full range of DispScale (i.e. ±61440 disparity units) is divided into a plurality of segments. In this embodiment and for ease of explanation, the segmented linear function has two segments. The gradients of the first segment and the second segment, in embodiments, are different. In particular, the gradient of the second segment is higher than the gradient of the first segment. The second segment is used to compand the luminance values associated with high levels of disparity and the first segment is used to compand the luminance values associated with lower levels of disparity.

For example, as noted above with reference to the logarithmic function, the lower levels of disparity are used in production of 3D content for display on TVs or in a movie theatre. More specifically, the first segment is used to compand approximately ±3.3% of the screen width and the second segment is used to compand between ±3.3% of the screen width and full screen width. As the gradient of the second segment is higher than the gradient of the first segment, the error associated with companding using the second segment is higher than the error associated with companding using the first segment. This means that the amount of error associated with luminance values representing a high disparity between the left image and the right image is higher for a given size companded luminance value.

In embodiments, the second segment has a gain gradient of 256 (or $2^8$) and the first segment has a gain gradient of 8 (or $2^3$). Accordingly, first segment loses the lowest 3 significant bits during companding and the second segment loses the lowest 8 significant bits during companding. Clearly, although the gain gradients have been specified as 8 and 256 respectively, any value may be selected. However, similarly to the logarithmic example, it is possible to select a smaller gradient for the most commonly used disparity to reduce the amount of error.

In embodiments, the companding function for the first segment is $$F(x) = 512 + \text{round}\left(\frac{x}{8}\right) \quad -2048 < x < 2048 \quad \text{[equation 5]}$$

And the companding function for the second segment is $$F(x) = 512 + \text{round}\left(\frac{x}{256} + 248\ \text{sign}(x)\right) \quad \begin{array}{c}-DispScale \leq x \leq -2048 \\ 2048 \leq x \leq DispScale\end{array} \quad \text{[equation 6]}$$

Where like variables are already defined in the logarithmic function.

The error function is the same as equation 4 above.
The decoding function associated with equation 5 is $$F^{-1}(y) = 8(y-512) \quad 256 < y < 768 \quad \text{[equation 7]}$$

And the decoding function associated with equation 6 is $$F^{-1}(y) = 256(y - 512 - 248\ \text{sign}(y - 512)) \quad \begin{array}{c}24 \leq y \leq 256 \\ 768 \leq y \leq 1000\end{array} \quad \text{[equation 8]}$$

In the case of a decoder being required to expand the companded function, it may be necessary for the encoder and decoder to exchange information indicating which encoding function is used to compand the disparity value. This exchange may, for example, occur during a handshaking protocol when the decoder and encoder are first connected or may be exchanged by adding an Ancillary data packet to the HD-SDI stream during encoding to indicate to the decoder which encoding scheme is used. Alternatively, this information may be provided by the user or the like.

However, it should be noted that the decoder and encoder may only need to exchange this information when different companding techniques are used. For example, if a decoder and encoder are configured to use both the logarithmic technique and the segmented linear technique. Further, in the event that 10-bit resolution provides sufficient accuracy for the vision mixer, no exchange is required.

Although the foregoing includes a disparity map being generated in the device, the disclosure is no way limited to this. Indeed, the creation of the disparity map itself should not limit the disclosure. For example, the disparity map may be created by a CGI animation package, or may have been previously captured and stored on a disk or memory device or the like.

Although illustrative embodiments of the disclosure have been described in detail herein with reference to the accompanying drawings, it is to be understood that the disclosure is not limited to those precise embodiments, and that various changes and modifications can be effected therein by one skilled in the art without departing from the scope and spirit of the disclosure as defined by the appended claims.

In so far as embodiments of the disclosure have been described as being implemented, at least in part, by software-controlled data processing apparatus, it will be appreciated that a non-transitory machine-readable medium carrying such software, such as an optical disk, a magnetic disk or the like is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the invention.

CROSS REFERENCE TO RELATED APPLICATIONS

The present application claims priority to United Kingdom Application GB1205758 filed on 30 Mar. 2012, the contents of which being incorporated herein by reference in its entirety.

The invention claimed is:

1. A method comprising:
obtaining, by circuitry, a disparity map for one of a left eye image and a right eye image, the disparity map indicating the horizontal displacement between corresponding pixels in the left eye image and the right eye image;
generating, by the circuitry, a luminance representation of the disparity map, wherein a disparity unit which defines the resolution of the disparity map, is mapped to a corresponding luminance value;
companding, by the circuitry, the luminance value for transmission over a luminance channel;
generating, by the circuitry, an error signal, the error signal being the difference between the companded luminance value and the luminance value; and
converting, by the circuitry, the error signal for transmission over a chrominance channel.

2. The method according to claim 1, wherein the luminance is companded using a logarithmic function.

3. The method according to claim 1, wherein the luminance is companded using a segmented linear function.

4. The method according to claim 2, wherein the companding function is selected according to the size of the display onto which the left eye image and the right eye image are to be stereoscopically displayed so that the gradient of the companding function is greatest at a disparity suited to the display $$F(x) = 512 + \text{round}\left(512\,\text{sign}(x)\frac{\ln\left(1+\mu\left|\frac{x}{\text{Dispscale}}\right|\right)}{\ln(1+\mu)}\right) F(x) =$$
$$512 + \text{round}\left(\frac{x}{8}\right) F(x) = 512 + \text{round}\left(\frac{x}{256} + 248\,\text{sign}(x)\right).$$

5. The method according to claim 1, further comprising expanding the companded luminance value; retrieving the error signal from the chrominance channel and adding the retrieved error signal to the expanded luminance value to form the original luminance value.

6. The method according to claim 1, comprising retrieving the companded luminance value from a look-up table where the companded luminance value is stored in association with the luminance value.

7. The method according to claim 1, comprising retrieving the error signal from a look up table where the error signal is stored in association with the luminance value.

8. A non-transitory computer-readable medium including computer program instructions, which when executed by a device, causes the device to perform a method according to claim 1.

9. An encoder comprising:
disparity map obtaining circuitry configured to obtain a disparity map for one of a left eye image and a right eye image, the disparity map indicating the horizontal displacement between corresponding pixels in the left eye image and the right eye image;
a luminance value generator circuitry configured to generate a luminance representation of the disparity map wherein a disparity unit, which defines the resolution of the disparity map, is mapped to a corresponding luminance value;
a companding circuitry configured to compand the luminance value for a luminance channel;
an error signal generator circuitry configured to generate an error signal, the error signal being the difference between the companded luminance value and the luminance value; and
an error signal converting device circuitry configured to convert the error signal for transmission over a chrominance channel.

10. The encoder according to claim 9, wherein the luminance is companded using a logarithmic function.

11. The encoder according to claim 9, wherein the luminance is companded using a segmented linear function.

12. The encoder according to claim 10, wherein the companding function is selected by the companding circuitry according to the size of the display onto which the left eye image and the right eye image are to be stereoscopically displayed so that the gradient of the companding function is greatest at a disparity suited to the display $$F(x) = 512 + \text{round}\left(512\,\text{sign}(x)\frac{\ln\left(1+\mu\left|\frac{x}{\text{Dispscale}}\right|\right)}{\ln(1+\mu)}\right) F(x) =$$
$$512 + \text{round}\left(\frac{x}{8}\right) F(x) = 512 + \text{round}\left(\frac{x}{256} + 248\,\text{sign}(x)\right).$$

13. The encoder according to claim 9, comprising a look up table, wherein the look up table is configured in use to store the companded luminance value in association with the luminance value, and the companding device circuitry is configured in use to retrieve the companded luminance value from the look-up table.

14. The encoder according to claim 13, wherein the look-up table is configured in use to store the error signal, where the error signal is stored in association with the luminance value and the companding device circuitry is further configured to retrieve the error signal from the look-up table.

* * * * *